(12) United States Patent
Moussaoui et al.

(10) Patent No.: US 8,723,490 B2
(45) Date of Patent: May 13, 2014

(54) CONTROLLING A BIDIRECTIONAL DC-TO-DC CONVERTER

(75) Inventors: Zaki Moussaoui, San Carlos, CA (US); Jifeng Qin, San Jose, CA (US); Joseph Buxton, Palo Alto, CA (US)

(73) Assignee: intersil Americas Inc., Milpitas, CA (US)

( * ) Notice: Subject to any disclaimer, the term of this patent is extended or adjusted under 35 U.S.C. 154(b) by 403 days.

(21) Appl. No.: 13/195,423

(22) Filed: Aug. 1, 2011

(65) Prior Publication Data

US 2012/0049772 A1 Mar. 1, 2012

Related U.S. Application Data

(60) Provisional application No. 61/378,324, filed on Aug. 30, 2010, provisional application No. 61/498,196, filed on Jun. 17, 2011.

(51) Int. Cl.
*G05F 1/00* (2006.01)

(52) U.S. Cl.
USPC .............................. 323/259; 323/284; 323/285

(58) Field of Classification Search
USPC .......... 323/222, 259, 271, 282, 284, 285, 344, 323/351, 283
See application file for complete search history.

(56) References Cited

U.S. PATENT DOCUMENTS

| | | | |
|---|---|---|---|
| 6,191,567 B1 * | 2/2001 | Sluijs | 323/259 |
| 6,636,431 B2 * | 10/2003 | Seki et al. | 363/65 |
| 7,265,524 B2 * | 9/2007 | Jordan et al. | 323/225 |
| 8,018,212 B1 * | 9/2011 | Petricek | 323/259 |
| 8,179,113 B2 * | 5/2012 | Singnurkar | 323/283 |
| 8,269,472 B2 * | 9/2012 | Lin | 323/282 |
| 2009/0128111 A1 * | 5/2009 | Chang Chien | 323/282 |

* cited by examiner

*Primary Examiner* — Gary L Laxton
*Assistant Examiner* — Afework Demisse
(74) *Attorney, Agent, or Firm* — Fogg & Powers LLC

(57) ABSTRACT

A system and method for regulating power flow and limiting inductor current in a bidirectional direct current (DC)-to-DC converter is provided. In one aspect, a feedback circuit is provided to control power flow and/or limit inductor current based on the input/output voltage and/or current conditions in the bidirectional DC-DC converter. During a boost mode of operation, the duty cycle of a low-side switch within the bidirectional DC-DC converter is reduced, based on an analysis of the high-side voltage and positive inductor current. Further, during a buck mode of operation, the duty cycle of the low-side switch is increased, based on an analysis of the low-side voltage and negative inductor current. Moreover, the duty cycle of the low-side switch is adjusted, such that, the high-side voltage, low-side voltage and inductor current (in both directions) do not exceed preset threshold and the bidirectional DC-DC converter returns to a steady state.

20 Claims, 13 Drawing Sheets

CONTROLLING A BIDIRECTIONAL DC-TO-DC CONVERTER

CROSS REFERENCE TO RELATED APPLICATIONS

This application claims priority to U.S. Provisional Patent Application Ser. No. 61/378,324, filed on Aug. 30, 2010, and entitled "AN APPARATUS AND METHOD FOR CONTROLLING A BI-DIRECTIONAL DC TO DC CONVERTER." This application also claims priority to U.S. Provisional Patent Application Ser. No. 61/498,196, filed on Jun. 17, 2011, and entitled "SYSTEM AND METHODOLOGY FOR CONTROLLING A BIDIRECTIONAL DC-TO-DC CONVERTER." The entirety of each of the above applications is incorporated by reference herein.

BRIEF DESCRIPTION OF THE DRAWINGS

The numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
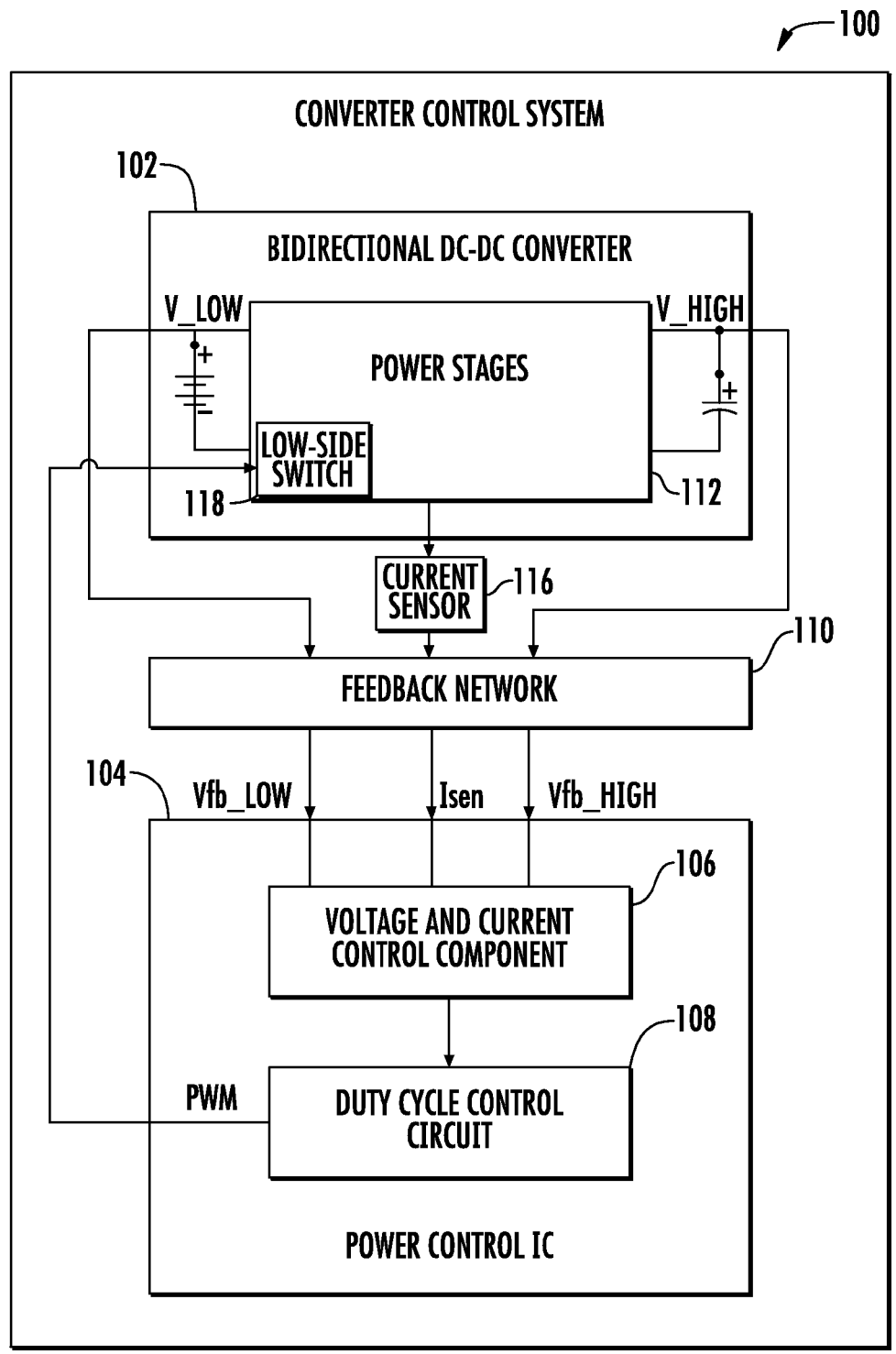
FIG. 1 illustrates an example converter control system that provides automatic power control and current limiting for bidirectional converters.

Systems and methods disclosed herein, in one or more aspects, provide automatic power flow control and both voltage and current regulation, in bidirectional direct current to direct current (DC-DC) converters. The subject matter is described with reference to the drawings, wherein like reference numerals are used to refer to like elements throughout. In the following description, for purposes of explanation, numerous specific details are set forth in order to provide a thorough understanding of the subject innovation. However, that the subject matter may be practiced without these specific details.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling.

Initially, referring to FIG. 1, there illustrated is an example converter control system 100 that provides automatic power control and current limiting for bidirectional converters, according to an aspect of the subject disclosure. In particular, an embodiment of system 100 can avoid a large positive/negative inductor current during boost/buck operation and prevent the system from sustaining damage. The system 100 can be implemented with any bidirectional converter topology as well as any two stage synchronous converter topology, utilized in various applications, such as, but not limited to industrial systems, automotive systems, robotics, telecommunications, etc.

Figure 2:
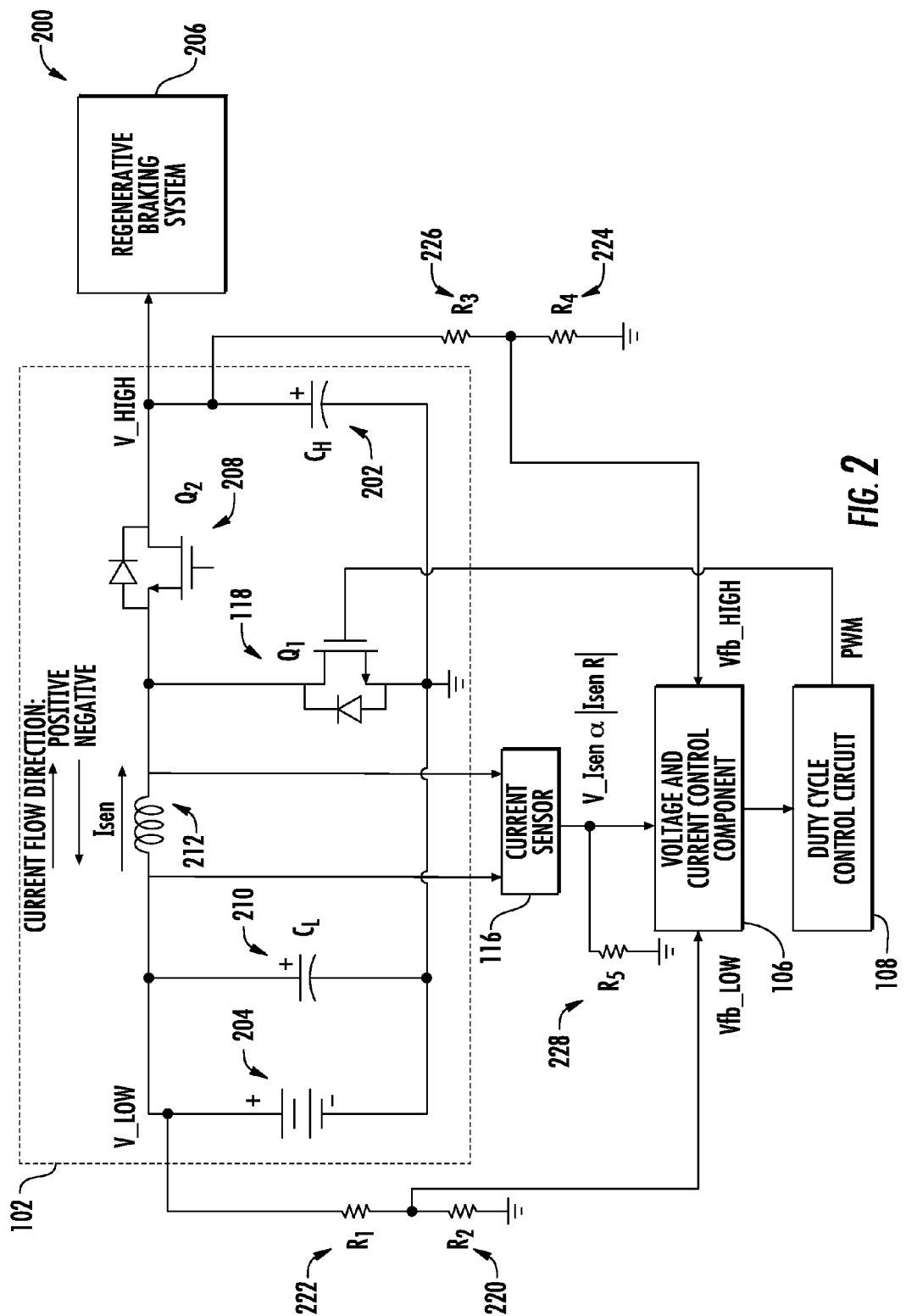
FIG. 2 illustrates an example system for regulating power flow in a bidirectional direct current to direct current (DC-DC) converter.

Typically, system 100 includes a bidirectional DC-DC converter 102 that periodically stores and releases energy into/from a magnetic field in an inductor (or optionally a transformer), as shown infra with respect to FIG. 2. Thus, energy can flow in both directions in the bidirectional DC-DC converter 102. By adjusting the duty cycle of the charging voltage (e.g., the ratio of charging time to non-charging time), the amount of energy transferred can be controlled. Usually, this is done to control the output voltage (V_high), though it can be done to control the input current, the output current, or maintain a constant power. In general, the bidirectional DC-DC converter 102 can include most any bidirectional topology, including, but not limited to, non-isolated and/or isolated topologies. In one example, the non-isolated topologies can comprise, but are not limited to, buck, boost, buck-boost, Ćuk, and/or charge pump converters, which are used for either step up or voltage inversion. In another example, the isolated topologies can comprise two-stage isolated bidirectional DC-DC converter, such as, but not limited to, fly-back, fly-forward, half bridge, full bridge and/or dual full bridge topologies.

In an embodiment, the bidirectional DC-DC converter 102 can include power stages (e.g., input stage, output stage) 112, which can be coupled to most any DC voltage source, such as, but not limited to, a battery, a super capacitor link, a solar panel, a rectifier, a DC generator, etc. and the example system shown in FIG. 1 connects a battery (V_low) across one side of the power stage 112 and a super capacitor link (V_high) across the other side of the power stage 112. According to an embodiment, the bidirectional DC-DC converter 102 enables current to flow within the converter 102 in two directions. For example, inductor current (Isen) can flow in a first direction during a first operating mode and a second direction during a second operating mode. Accordingly, the alternating current (AC) output of the converter 102 is bidirectional. In one aspect, a power control integrated circuit (IC) 104 is provided to control the power and limit the current flow in each direction. Moreover, the power control IC 104 automatically changes the current flow of power based on the real-time conditions in the power stage 112.

In particular, the power control IC 104 can include a voltage and current control component 106 that facilitates control of the voltages at the power stage 112, and limit the current (Isen) in both directions. Moreover, the voltage and current control component 106 receives voltage and/or current signals from a feedback network 110. As an example, the feedback network 110 can scale the sensed low-side/high-side voltages (V_low, V_high) and provide the scaled voltages (Vfb_low, Vfb_high) to the voltage and current control component 106. Additionally, the feedback network 110 can obtain a current signal (Isen) from a current sensor 116, and provide the current signal (Isen) to the voltage and current control component 106. Optionally, the feedback network 110 can convert the current signal (Isen) to a corresponding voltage signal and provide the corresponding voltage signal to the voltage and current control component 106.

The power control IC 104 further includes a duty cycle control circuit 108 that adjusts the duty cycle (e.g., the time that a switch is in an "ON state" versus the time it is in an "OFF state" in one switching cycle) of a low-side switch 118 within the bidirectional DC-DC converter 102, based on an output from the voltage and current control component 106. Moreover, the duty cycle control circuit 108 regulates the duty cycle of a pulse width modulated (PWM) signal, which is utilized to control switching of the low-side switch 118. Accordingly, the duty cycle of the low-side switch 118 is regulated based on the real-time values of V_low, V_high and/or Isen, such that the bidirectional DC-DC converter 102 is automatically brought to a steady state. Specifically, the power control IC 104 can facilitate an automatic change in the power flow based on the real-time values of voltage (V_low/V_high) and/or current (Isen) condition, and limit the current flow in both directions, thus providing a robust system.

In other words, converter control system 100 includes a plurality of control loops that utilize a voltage or a current signal received from a bidirectional DC-DC converter, to automatically and adaptively control operation of the bidirectional DC-DC converter based on an analysis (e.g., comparison with threshold voltages) of the received voltage or current signal. Moreover, the duty cycle control circuit 108 adaptively provides a pulse width modulated (PWM) signal that controls a duty cycle of a switch 118 within the bidirectional DC-DC converter.

It can be appreciated that the design of system 100 can include different component selections, topologies, etc., to achieve a control signal that dynamically regulates the duty cycle of the low-side switch 118 based on the real-time input/output voltage (V_low/V_high) and/or current (Isen) conditions. Moreover, it can be appreciated that the voltage and current control component 106, the duty cycle control circuit 108, the feedback network 110, and the bidirectional DC-DC converter 102 can include most any electrical circuit(s) that can include components and circuitry elements of any suitable value in order to implement the embodiments of the subject innovation. Furthermore, it can be appreciated that the components of system 100 can be implemented on one or more integrated circuit (IC) chips.

Referring now to FIG. 2, there illustrated is an example system 200 for regulating power flow in a bidirectional DC-DC converter 102, according to an aspect of the specification. The bidirectional DC-DC converter 102 typically includes an inductor ($L_f$) 212 and two switches (e.g., comprising two transistors $Q_1$ 118 and $Q_2$ 208) that control the inductor ($L_f$) 212. Current can flow both directions through the inductor ($L_f$) 212. The switches $Q_1$ 118 and $Q_2$ 208 can be metal-oxide-semiconductor field-effect transistor (MOSFET) switches, as illustrated in FIG. 2, with the body diodes of the MOSFETs shown. As an example, the switches ($Q_1$ 118 and $Q_2$ 208) alternate between connecting the inductor ($L_f$) 212 to a source voltage to store energy in the inductor, and discharging the inductor into the load. In one example, switch $Q_1$ 118 is termed as an "active switch," "low-side switch," and/or "main switch," since $Q_1$ 118 is a switching element required for operation of the DC-to-DC converter (unidirectional and/or bidirectional). Additionally, $Q_2$ 208 is termed as a "passive switch," "high-side switch," and/or a "synchronous switch," since $Q_2$ 208 is an optional switching element required only during operation of a bidirectional DC-to-DC converter (e.g., a free wheeling diode can be utilized instead of the passive switch for unidirectional DC-to-DC converter operation). Typically, the switches ($Q_1$ 118 and $Q_2$ 208) are driven by a pulse width modulated (PWM) signal, which is controlled by the duty cycle control circuit 108.

The exemplary converter 102 is employed in a variety of configurations by coupling the input and output to batteries and/or super capacitors. In one example, as depicted in FIG. 2, the input is connected to a low voltage battery 204 (e.g., 12-14 Volts) and output of the converter 102 is connected to a super capacitor link 202. Moreover, the input stage (or terminal) is termed as the low voltage side/low-side (V_low) and the output stage (or terminal) is termed as the high voltage side/high-side (V_high) in this particular embodiment. Inductor current (Isen) can flow both directions through the inductor ($L_f$) 212. For example, if the current (Isen) flows from the low voltage side to the high voltage side, the inductor current (Isen) is defined as positive and if the inductor current (Isen) flows from the high voltage side to the low voltage side, the inductor current (Isen) is defined as negative. In addition, the bidirectional DC-DC converter 102 includes a low-side capacitor ($C_L$) 210 in parallel with the low voltage battery 204. Further, the switches ($Q_1$ 118 and $Q_2$ 208) are complementary switches, such that, when $Q_1$ (118) is turned "ON," $Q_2$ (208) switches "OFF," and when $Q_1$ (118) is switched "OFF," $Q_2$ (208) is turned "ON", neglecting dead time.

In one embodiment, the voltage and current control component 106 receives feedback from both the high and low voltage sides of converter 102. Optionally, voltage divider circuits, for example, employing resistors $R_1$-$R_2$ (220, 222) and $R_3$-$R_4$ (224, 226) can be employed to scale the voltage at V_low and V_high, and provide the scaled versions (Vfb_low and Vfb_high) of V_low and V_high, to the voltage and current control component 106. In addition, a current sensor 116 can be employed to detect the current (Isen) through the inductor ($L_f$) 212 and the resistor $R_5$ (228) can be utilized to generate a voltage (V_Isen) indicative of the current (Isen) through the inductor ($L_f$) 212. The voltage and current control component 106 processes the feedback voltages (Vfb_low, Vfb_high, and V_Isen) to generate a signal that adjusts the width of a PWM signal, which controls the switching of $Q_1$ 118 and $Q_2$ 208, such that the power flow in the converter 102 is regulated. Moreover, the duty cycle control circuit 108 generates the PWM signal based on a control signal output by the voltage and current control component 106. The PWM signal is coupled to the gate of $Q_1$ 118, and is utilized to control the duty cycle of $Q_1$ 118.

Although a non isolated bidirectional DC-DC converter 102 is depicted in FIG. 2, it can be appreciated that system 200 can be implemented into any bidirectional topology (isolated or non isolated) as well as any two stage synchronous topology, utilized in different applications, such as, but not limited to industrial automation systems, automotive systems, robotics, etc. In one example, an electronic system, such as, but not limited to, a regenerative braking system 206 (e.g., electric motor) in an automobile can be coupled to the high voltage side. It can be appreciated that the resistors $R_1$-$R_5$ (220-228) and capacitors $C_H$ 202 and $C_L$ 210 can have suitable resistance and capacitance values (or ratios) respectively depending on the application. Further, inductor $L_F$ 212 can have most any inductance value depending on the application. Furthermore, although switches $Q_1$ (118) and $Q_2$ (208) are depicted as MOSFETs, the subject specification is not so limited and most any type of switch can be employed.

Figure 3:
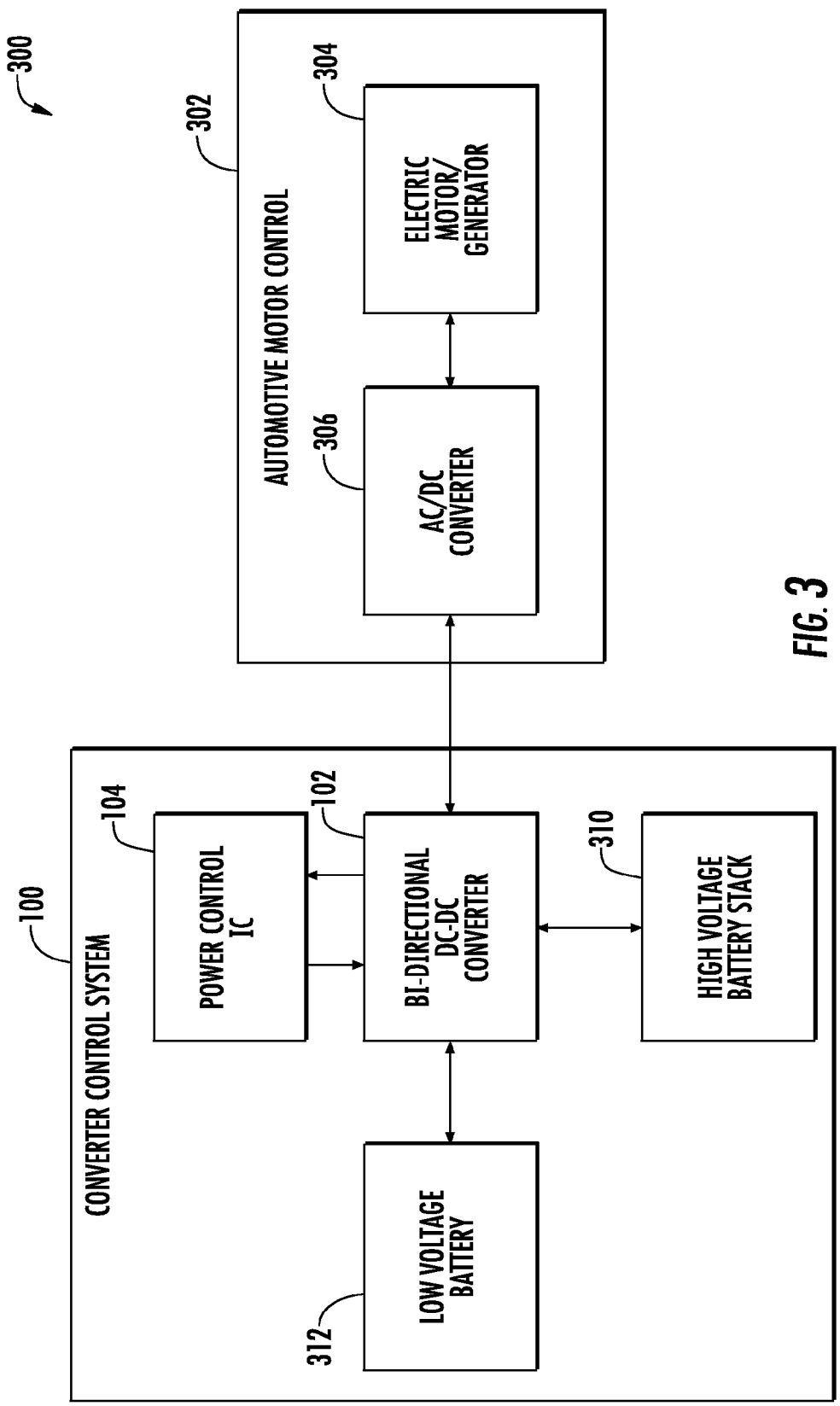
FIG. 3 illustrates an example system utilized for power generation in hybrid electrical vehicle (HEV) and/or electrical vehicle (EV) systems.

FIG. 3 illustrates an example system 300 utilized for power generation in hybrid electrical vehicle (HEV) and/or electrical vehicle (EV) systems. In one aspect, a high voltage (e.g., 200-400 Volts) battery stack 310 is used as energy storage at the output stage (high-side) in the converter control system and a low voltage (e.g., 12-14 Volts) battery 312 is connected to the input stage (low-side) in the converter control system 100. The charging of the high battery pack 310 is done through an isolated AC-DC converter 306, coupled to an electric motor/generator 304, whereas the charging of the low battery pack 312 is done through an isolated DC-DC converter 102 within the converter control system 100. Given the large fluctuation of the high voltage battery pack 310, oftentimes a pre-regulator can be inserted between the low voltage battery 312 and the input of the isolated DC-DC converter 102 within the converter control system 100, such that the transformer designs can be optimized.

In one aspect, the converter control system 100 links the different DC voltage buses and transfers energy back and forth (in two directions). For example, the converter control system 100 can facilitate conversion of the high voltage (e.g., 200-300V) in the battery 310 to low voltage (e.g., 12V) for use in electrical equipment in the HEV. In another example, the converter control system 100 can facilitate conversion of a battery voltage (e.g., 300V to 500V) 310 and supply the converted voltage to a drive motor 304 in the HEV. Specifically, the power control IC 104 ensures an automatic and/or dynamic change in the power flow based on the existing input/output voltage/current condition(s), and creates a robust system by automatically and/or dynamically limiting the inductor current.

In an embodiment, for the converter 102 configured for use within an electric car with a motor/generator 304 and batteries (310, 312), the configuration connects the battery 310 to the motor 304 when the motor is propelling the vehicle (e.g., so the current flow of power is from the battery 310 to the motor/generator 304), and switches the current flow of power to motor/generator 304 to battery 310 when the car brakes (e.g., so that the current flow is in the opposite direction, traveling from the motor 304 to the battery 310, charges the battery). Automatic voltage and current regulation is provided by the power control IC 104 to limit current flow, if that flow exceeds a threshold or to boost that load, if that flow drops beneath a threshold.

Figure 4:
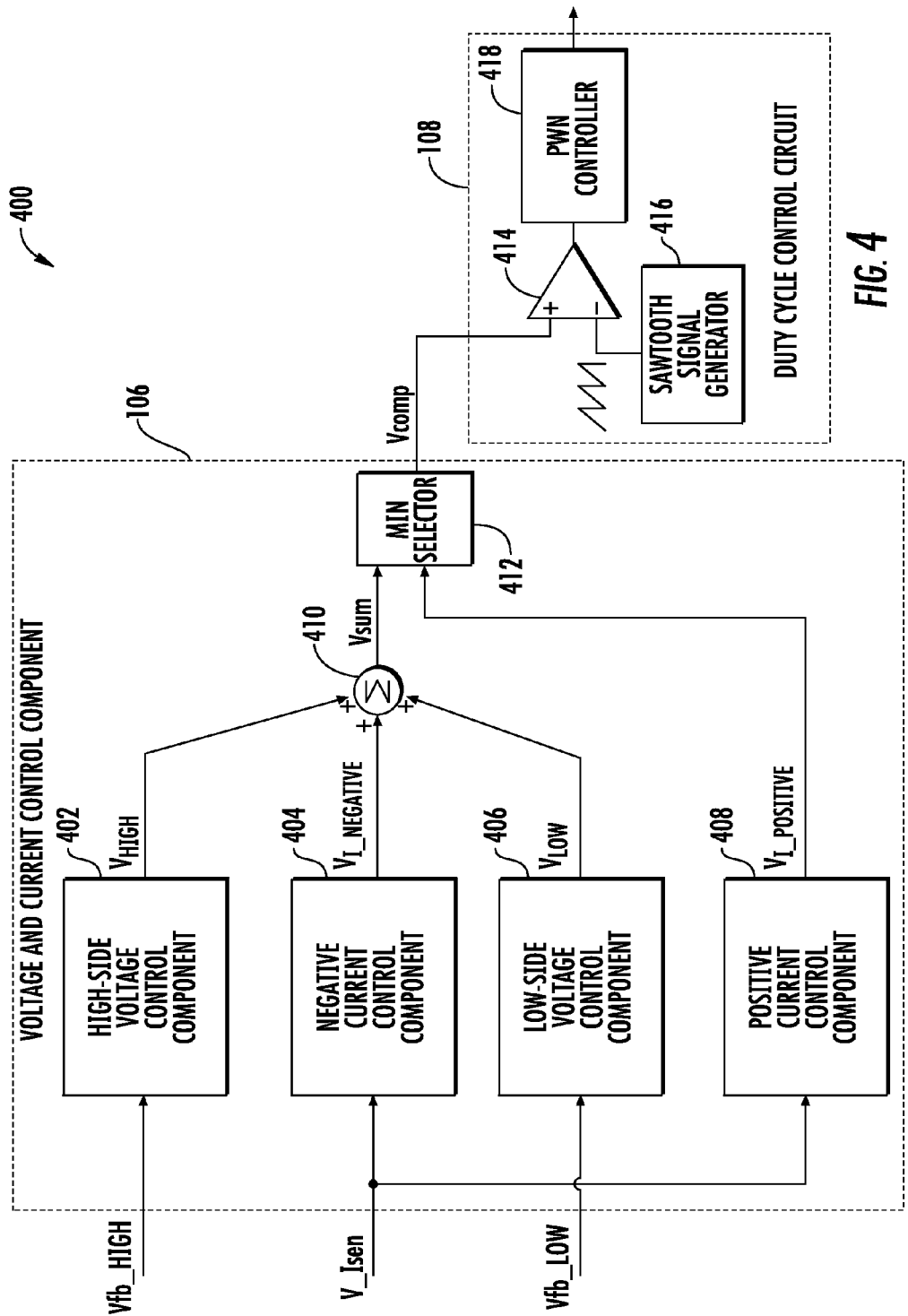
FIG. 4 illustrates an example system that facilitates both voltage and current regulation in a bidirectional DC-DC converter.

FIG. 4 illustrates an example system 400 that facilitates voltage and current regulation in bidirectional DC-DC converter in accordance with an aspect of the disclosure. In one embodiment, the voltage and current control component 106, includes a high-side voltage control component 402, a negative current control component 404, a low-side voltage control component 406, and a positive current control component 408. Typically, only two of these components are activated during a particular time period/mode of operation. For example, during a boost operation the high-side voltage control component 402 and the positive current control component 408 are activated, while the negative current control component 404 and the low-side voltage control component 406 are deactivated. In another example, after regenerative braking (e.g., in a HEV or EV), the negative current control component 404 and the low-side voltage control component 406 are activated; while the high-side voltage control component 402 and the positive current control component 408 are deactivated.

According to an aspect, the high-side voltage control component 402 receives the voltage (V_high) or the scaled version of the voltage (Vfb_high) at the high-side battery in the bidirectional DC-DC converter, and compares the V_high or Vfb_high with a preset threshold voltage to regulate the high-side voltage in the bidirectional DC-DC converter. Similarly, the low-side voltage control component 406 receives the voltage (V_low) or the scaled version of the voltage (Vfb_low) at the low-side battery in the bidirectional DC-DC converter, and compares the V_low or Vfb_low with another preset threshold voltage to regulate the low-side voltage in the bidirectional DC-DC converter. Further, the negative current control component 404 and the positive current control component 408 receive a voltage signal indicative of the current through the inductor ($L_F$) in the bidirectional DC-DC converter and compare the voltage signal to preset thresholds in order to limit the current in both the positive and negative direction. In addition, the voltage and current control component 106 can include a voltage summer 410 and a minimum voltage selector 412, operation of which is described in detail, infra.

The voltage and current control component 106 generates a Vcomp signal, which is utilized by the duty cycle control circuit 108 to regulate the power flow in the bidirectional DC-DC converter. In one aspect, a sawtooth waveform, generated by a sawtooth signal generator 416, is subtracted from the Vcomp signal, for example by comparator 414, and the resulting signal is utilized to adjust the width of a PWM signal, generated by a PWM controller 418: Moreover, the PWM signal is utilized to control the duty cycle of the low-side switch $Q_1$ 118 in the bidirectional DC-DC converter. Although the duty cycle control circuit 108 disclosed herein depicts a single phase PWM control, it can be appreciated that the subject innovation is not so limited and that the duty cycle control circuit 108 can include multi-phase PWM control.

Figure 5:
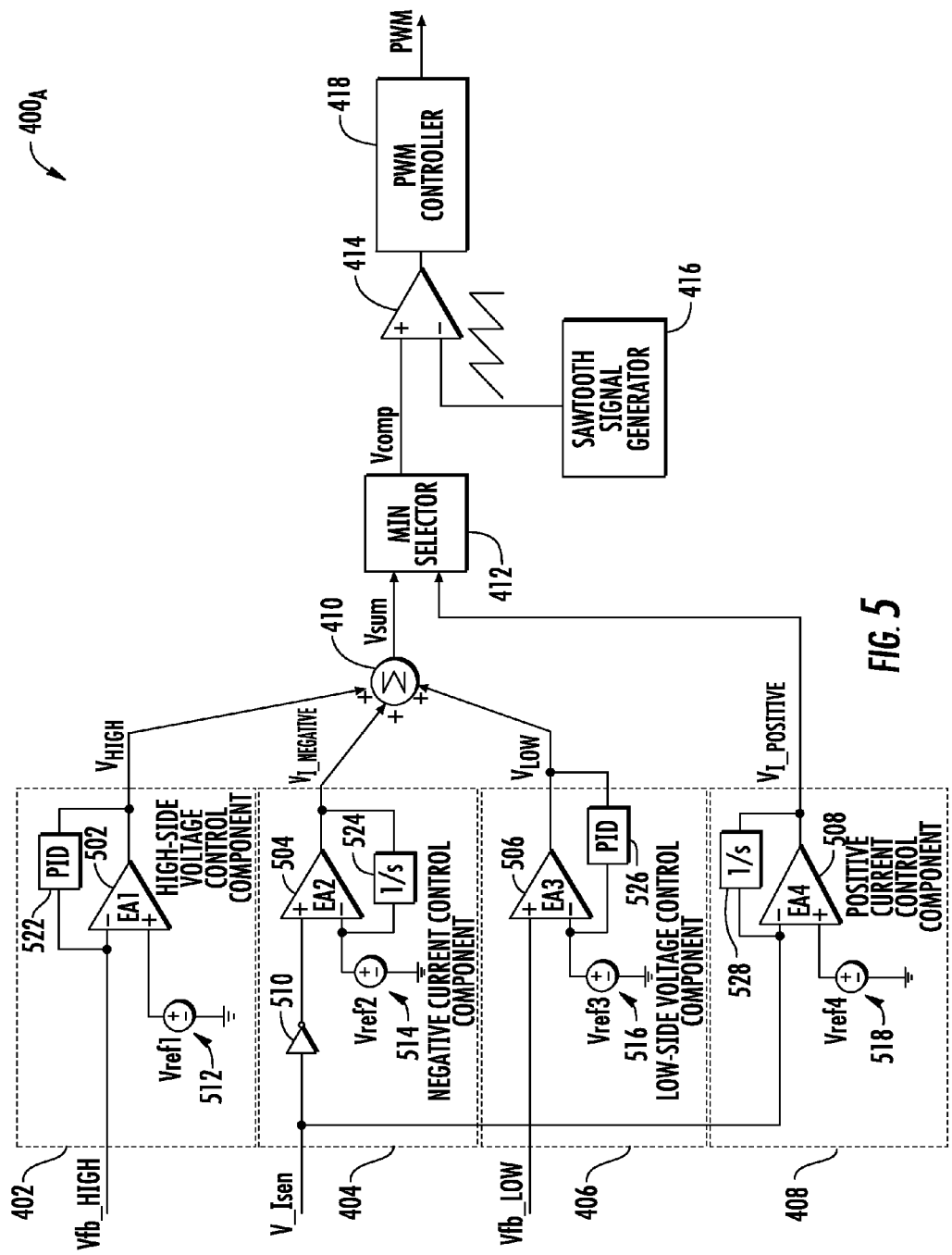
FIG. 5 illustrates an example feedback system that facilitates automatic power flow regulation in a bidirectional DC-DC converter.

Referring now to FIG. 5, there illustrated is an example implementation (400$_A$) of feedback system 400 that facilitates automatic power flow regulation in a bidirectional DC-DC converter in accordance with an aspect of the innovation. The feedback system 400$_A$ depicts example circuits for the high-side voltage control component 402, the negative current control component 404, the low-side voltage control component 406, and the positive current control component 408. Specifically, the example circuits include error amplifiers EA1-EA4 (502-508), preset voltage references Vref1-Vref4 (512-518) and feedback elements (e.g., proportional-integral-derivative controller (PID) controller) (522, 526) or delay element (1/s) (524, 528)). Typically, reference voltages Vref1-Vref4 (512-518) can be preset to most any threshold value (in Volts) to limit the voltage on the high-side (e.g., Vref1 512), voltage on low-side (e.g., Vref3 516), inductor current in the negative direction (e.g., Vref2 514) and/or inductor current in the positive direction (e.g., Vref4 518). It can be appreciated that resistors can be coupled between reference voltages (512-518) and their respective error amplifiers (502-508).

According to an aspect, when inductor current flows in the positive direction, i.e. from low-side to high-side of the bidirectional DC-DC converter, the high-side voltage control component 402 controls the voltage V_high to a value based on Vref1 512 and the positive current control component 408 limits the inductor current to a value corresponding to Vref4 518. Alternately, when inductor current flows in the negative direction, i.e. from high-side to low-side of the bidirectional DC-DC converter, the low-side voltage control component 406 controls the voltage V_low based on the value of Vref3 516 and the negative current control component 404 limits the inductor current to a minimum value (e.g., maximum absolute value of a negative current) corresponding to Vref2 514. The operation of the example circuits is described in detail with respect to FIGS. 6A-C below.

Figure 6A:
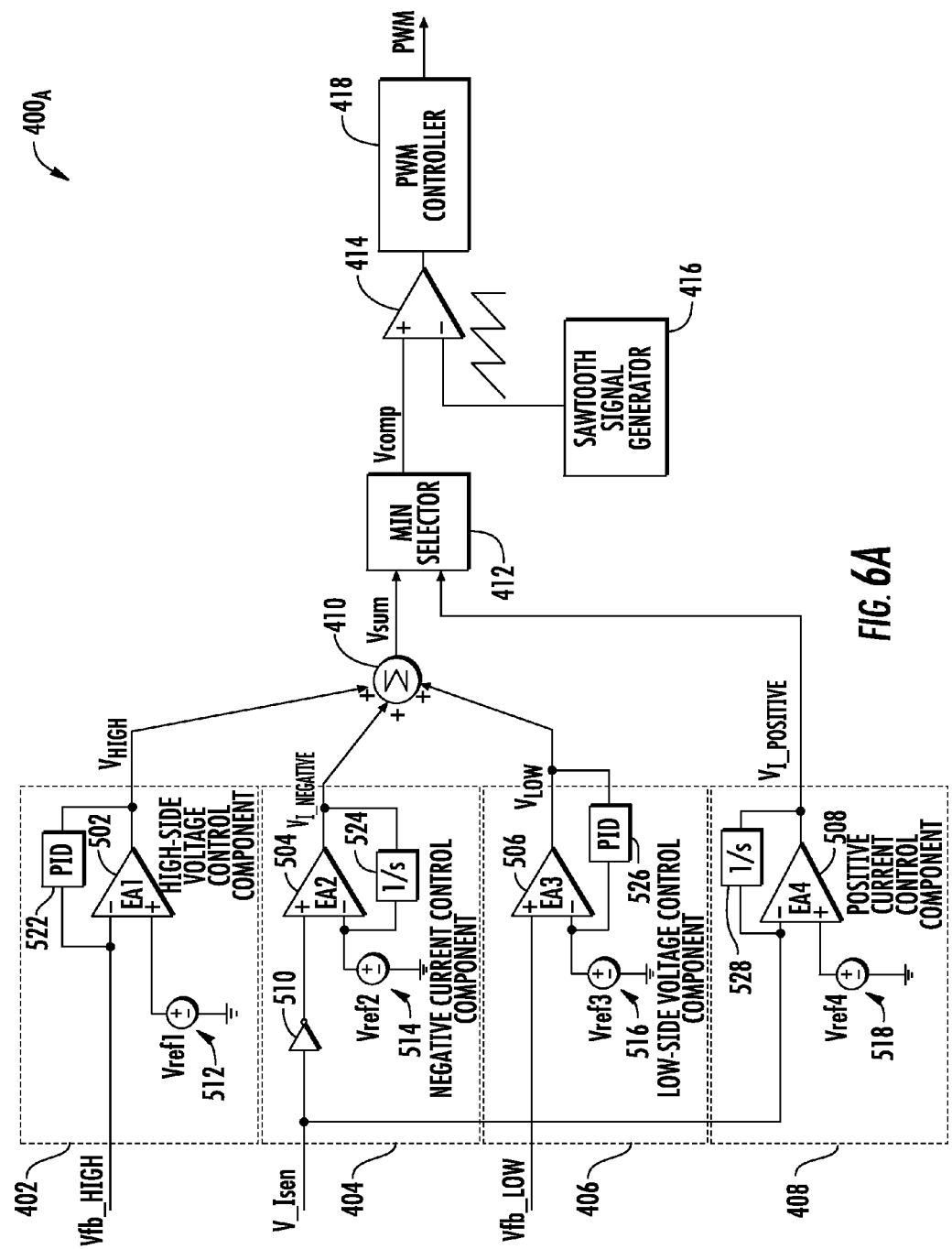
FIGS. 6A-C illustrate operation of an example feedback circuit utilized to facilitate automatic power flow regulation in a bidirectional DC-DC converter, and signal waveforms at various nodes in the bidirectional DC-DC converter during the operation.
Figure 6B:
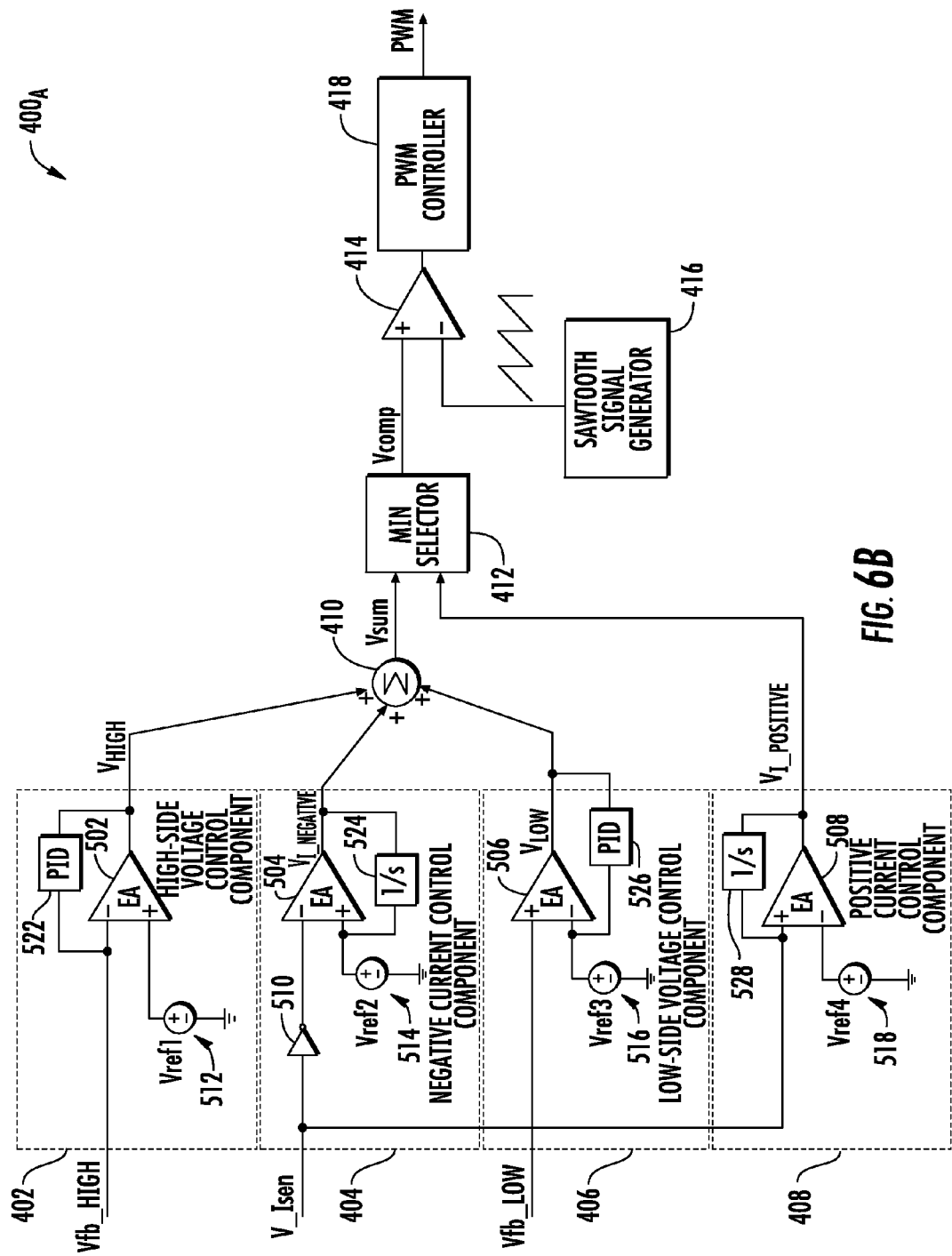

FIGS. 6A and 6B illustrate operation of the example circuit $400_A$ utilized to facilitate automatic power flow regulation in a bidirectional DC-DC converter. Consider the bidirectional DC-DC converter operating as a boost converter, such that, the inductor current flows in a positive direction (e.g., from low-side to high-side) and the system is in a steady state. In this scenario, the outputs of the negative current control component 404 and the low-side voltage control component 406 are deactivated since error amplifiers EA2 504 and EA3 506 generate a low output (e.g., $V_{I\_negative}$ and $V_{low}$ respectively are zero/negative voltage). Moreover, since the inductor current is positive, the voltage indicative of the inductor current, V_Isen, is positive, which is inverted by inverter 510. Accordingly, the output of EA2 504 is low (e.g., negative saturation voltage). Similarly, the output of EA3 506 is low (e.g., zero), because the inductor current is positive and Vfb_low<Vref3.

In contrast, the outputs of the high-side voltage control component 402 and the positive current control component 408 are activated, such that, error amplifiers EA1 502 and EA4 508 generate a high output ($V_{high}$ and $V_{I\_positive}$, respectively). In particular, the error amplifier EA1 502, of the high-side voltage control component 402, compares the scaled high-side voltage (Vfb_high) with the preset reference voltage Vref1 512 and generates a high voltage ($V_{high}$) as long as Vfb_high<Vref1. Thus, the summer 410 will output Vsum=$V_{high}$. Additionally, the error amplifier EA4 508, of the positive current control component 408, compares the voltage indicative of the inductor current, V_Isen, with the preset reference voltage Vref4 518 and generates a high voltage ($V_{I\_positive}$) until V_Isen becomes greater than (or equal to) Vref4. In the case when V_Isen<Vref4, $V_{I\_positive}$ is always high, and the output of the minimum voltage selector 412, Vcomp will be equal to $V_{high}$. Moreover, the $V_{high}$ signal will be utilized to control the duty cycle of the low-side switch $Q_1$ 118 in the bidirectional DC-DC converter. Accordingly, if the scaled high-side voltage (Vfb_high) increases beyond the preset Vref1 limit, $V_{high}$, will be low, and Vcomp will be low, thus causing the PWM controller 418 to modify the width of the PWM signal, which in turn will control the duty cycle of the low-side switch $Q_1$ 118, such that the high-side voltage is decreased (until Vfb_high<Vref1).

Further, as inductor current increases in the positive direction, V_Isen increases and $V_{I\_positive}$ will decrease. If V_Isen>Vref4 518, $V_{I\_positive}$ will be less than Vsum=$V_{high}$, and the output of the minimum voltage selector 412 Vcomp will be equal to $V_{I\_positive}$. Moreover, the Vcomp=$V_{I\_positive}$, will cause the PWM controller 418 to modify the width of the PWM signal, which in turn will control the duty cycle of the low-side switch $Q_1$ 118, such that the positive inductor current is decreased. Thus, when the bidirectional DC-DC converter operating as a boost converter, system $400_A$ controls the high-side voltage, if the positive inductor current is within the preset limit Vref4 518, and controls (limits) the inductor current, preventing the positive inductor current from increasing beyond the preset limit Vref4 518.

Consider another example scenario, when energy is applied to the high-side of the bidirectional DC-DC converter, for example, by an electric motor during regenerative braking. In this example scenario, the voltage at V_high will observe a voltage overshoot transient, and accordingly the scaled voltage Vfb_high increases beyond Vref1 512. Thus, the output of the error amplifier EA1 502, of the high-side voltage control component 402 reduces (e.g., to zero) and accordingly, Vcomp reduces. This results in gradual reduction of the duty cycle of the PWM signal and thus gradual reduction of the duty cycle of the low-side switch $Q_1$ 118, until the minimum duty cycle of the low-side switch $Q_1$ 118 is reached (and thus maximum duty cycle of the high-side switch $Q_2$ 208 is reached). At this stage, the configuration of the low-side and high-side switches enables minimum time for the inductor ($L_F$) to charge and maximum time for the inductor ($L_F$) to discharge. Accordingly, the positive inductor current reduces and eventually changes direction into a negative inductor current automatically. Moreover, the bidirectional DC-DC converter can now operate as a Buck converter instead of a boost converter.

FIG. 6B illustrates the operation of the feedback system $400_A$ when the bidirectional DC-DC converter operates as a buck converter, for example, during and/or after regenerative braking. During this mode of operation, current flows through the inductor ($L_F$) in the negative direction (e.g., from high-side to low-side). In this case, the outputs of the high-side voltage control component 402 and the positive current control component 408 do not affect the Vcomp signal. Moreover, since Vfb_high>Vref1, $V_{high}$ is low (e.g., zero) and since inductor current is negative, V_Isen<Vref4, and $V_{I\_positive}$ is high (e.g., Vcc). Accordingly, the outputs of the negative current control component 404 and the low-side voltage control component 406 control the duty cycle of the low-side switch $Q_1$ 118 during the buck mode of operation.

In one aspect, when negative inductor current is lower than the preset threshold Vref2 514, i.e. the inverted version of V_Isen is less than Vref2 514, $V_{I\_negative}$ is low, and Vcomp is controlled by the output of the low-side voltage control component 406. Moreover, the output $V_{low}$ of the low-side voltage control component 406 is low, until Vfb_low becomes greater than Vref3 516, and Vcomp, which is equal to Vsum, is low. However, if the scaled low-side voltage, Vfb_low, increases beyond the preset limit Vref3 516, $V_{low}$ increases, and thus Vsum increases, and accordingly, Vcomp increases. Moreover, the duty cycle of the low-side switch $Q_1$ 118 is increased and in turn the duty cycle of the high-side switch $Q_2$ 208 is decreased. This increases the charging time for the inductor ($L_F$) and reduces the discharging time for the inductor ($L_F$), such that the low-side voltage (V_low) decreases. In another aspect, when the magnitude of negative inductor current increases and the inverted version of V_Isen is greater than the preset threshold Vref2 514, $V_{I\_negative}$ becomes high, which in turn causes Vcomp to increase and increase the duty cycle of the low-side switch $Q_1$ 118. Once again, the duty cycle of the low-side switch $Q_1$ 118 is regulated such that the negative current reduces and the system returns to a steady state.

Figure 6C:
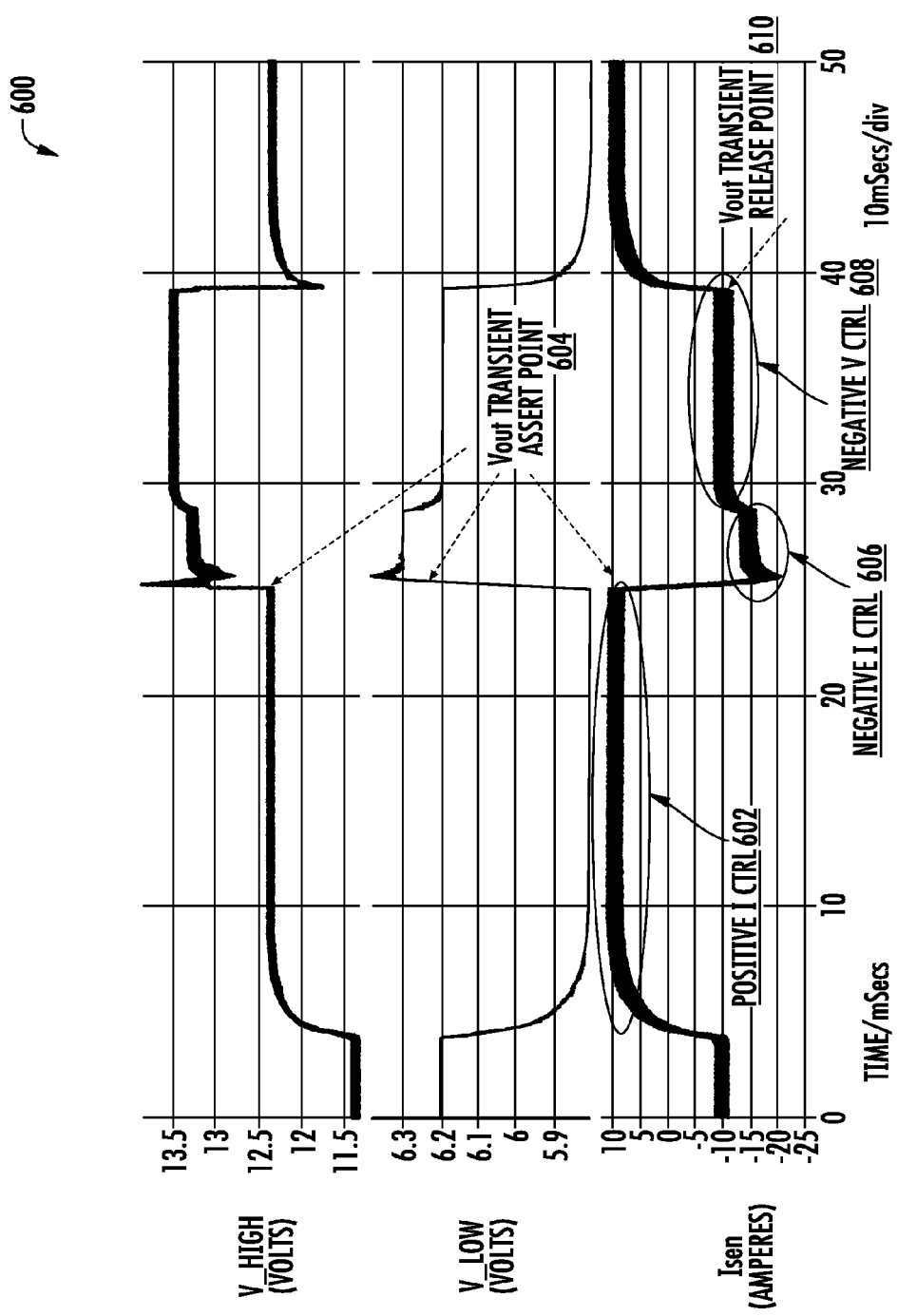

FIG. 6C illustrates example waveforms 600 for the voltage and current in the bidirectional DC-DC converter during boost and buck modes of operation. System $400_A$ is utilized to sense the voltages V_high and V_low, at the high and low sides of the bidirectional DC-DC converter and sense the inductor current Isen. The system $400_A$ provides feedback to control the duty cycle of the low-side switch $Q_1$ 118 based on the sensed voltage and current signals. Typically, during the period that inductor current (Isen) is positive, the bidirectional DC-DC converter operates as a boost converter, and when the inductor current (Isen) is negative, the bidirectional DC-DC converter operates as a buck converter.

As the positive inductor current (Isen) increases, at 602, the positive inductor current (Isen) is limited to 10 Amperes, by the positive current control component 408. Further, at 604, a transient voltage (Vout) is applied at the high-side voltage. As seen in FIG. 6C, the voltages V_high and V_low increase exponentially and the inductor current (Isen) decreases. At 606, the negative current is clamped to −15 Amperes by the negative current control component 404. Further, as the inductor current falls below the predefined threshold (of 15 Amperes), at 608, the low-side voltage control component, regulates the low-side voltage (V_low) to a predefined value of 6.2 Volts. Moreover, at 610, the voltage transient, applied at the high-side, can be released and the bidirectional DC-DC converter can return to a steady state.

Figure 7:
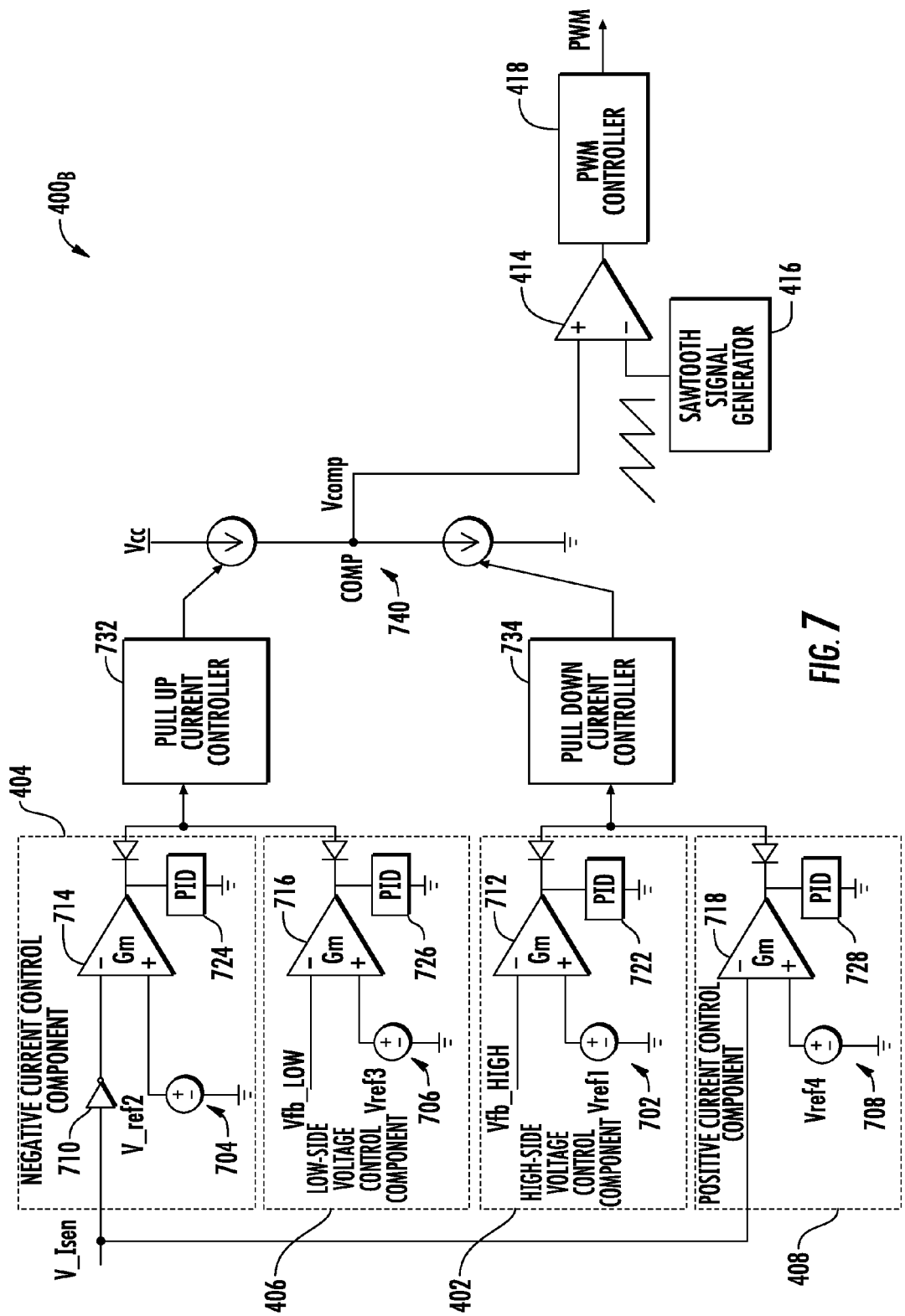
FIG. 7 illustrates another example system that facilitates both voltage and current regulation in bidirectional DC-DC converter.

FIG. 7 illustrates another implementation (400$_B$) of example system 400 that facilitates voltage and current regulation in bidirectional DC-DC converter, according an aspect of the disclosure. In one embodiment, the high-side voltage control component 402, negative current control component 404, low-side voltage control component 406, and positive current control component 408, include operational transconductance amplifiers (712-718) that generate a current signal based on a differential input voltage. Further, the voltage and current control component includes preset voltage references Vref1-Vref4 (702-708) and PID controllers (722-728) for component compensation. It can be appreciated that additionally or alternatively a PID controller can also be employed at the COMP node 704 (not shown) to ensure stability of the controller. Typically, reference voltages Vref1-Vref4 (702-708) can be preset to most any threshold value (in Volts) to limit the voltage on the high-side (e.g., Vref1 702), voltage on low-side (e.g., Vref3 706), inductor current in the negative direction (e.g., Vref2 704) and/or inductor current in the positive direction (e.g., Vref4 708).

In one aspect, the negative current control component 404 and low-side voltage control component 406 are utilized to pull up the current at the COMP node 740, by employing the pull up current controller 732. Whereas the high-side voltage control component 402 and positive current control component 408 are utilized to pull down the current at the COMP node 740, by employing the pull down current controller 734. During normal operation, for example when inductor current is positive, the pull up current is fixed and pull down current is controlled by the high-side voltage control component 402 and positive current control component 408, such that, Vcomp is reduced and the high-side voltage and the positive inductor current are limited to preset values (based on Vref1 702 and Vref4 708). Alternatively, when the power flow in the bidirectional DC-DC converter is reversed, such that inductor current is negative (e.g., during and/or after regenerative braking), the pull up current is controlled by the negative current control component 404 and the low-side voltage control component 406 such that, Vcomp is increased and the low-side voltage and the negative inductor current are limited to preset values (based on Vref3 706 and Vref2 704). In one example, the pull up current controller 732 can be inverting, e.g., the high side current is increasing when the input voltage of the pull up current controller 732 is decreasing.

By utilizing the abovementioned control schemes, the bidirectional system can automatically change the power flow based on the input/output voltage/current condition. Furthermore, the system is robust since the inductor current is automatically limited in both directions.

Figure 8:
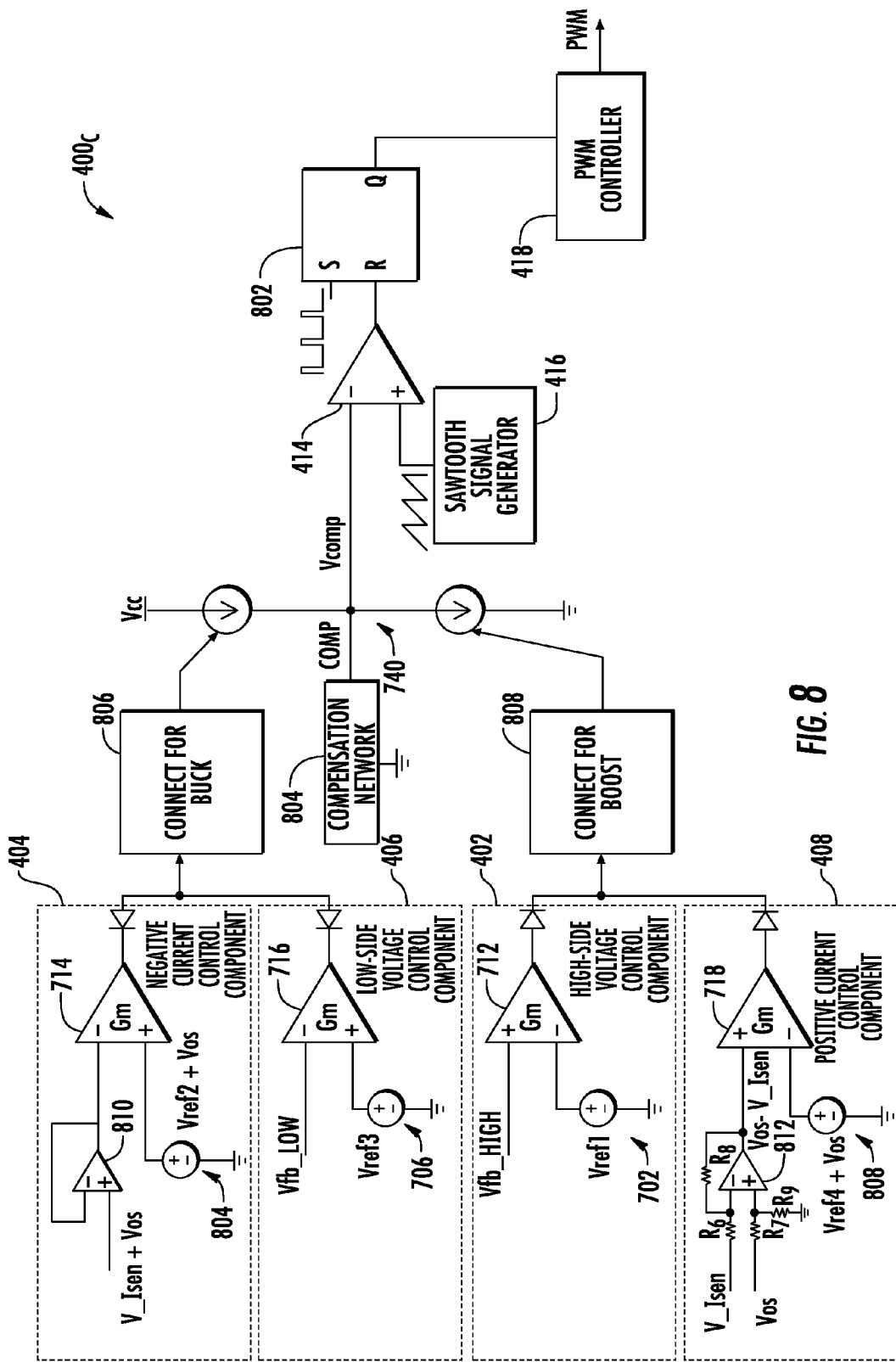
FIG. 8 illustrates still another example implementation for a system that facilitates both voltage and current regulation in bidirectional DC-DC converter.

FIG. 8 illustrates another implementation for the example system 400$_C$ for automatically controlling a bidirectional DC-DC controller. According to an aspect, the system 400$_C$ can operate in two modes, for example, controlling a boost mode of operation of the bidirectional DC-DC converter in the first mode, and controlling a buck mode of operation of the bidirectional DC-DC converter in the second mode. Moreover, a user/customer can select a first mode of control, by connecting the negative current control component 404 and low-side voltage control component 406 for controlling the buck mode of operation, by employing a connection circuit 806 (e.g., pull up current controller). Alternatively, the user/customer can select a second mode of control, by connecting the high-side voltage control component 402 and positive current control component 408, for controlling the boost mode of operation, by employing a connection circuit 808 (e.g., pull down current controller). Accordingly, system 400$_C$ enables user selection of control modes.

In one aspect, the negative current control component 404 and positive current control component 408 can utilize an offset voltage (Vos) to avoid utilizing negative voltage sources in the system 400$_C$. Typically, the negative current control component 404 can include an operational amplifier 810 utilized as a voltage follower. Further, the positive current control component 408 includes another operational amplifier 812 utilized as a voltage subtractor to generate the Vos-V_Isen signal. The components 402-408 operate as explained in detail supra with respect to systems 100-400. In general, system 400$_C$ can include a compensation network 804 that stabilizes the system 400$_C$. In addition, a latch 802 (e.g., set-reset flip flop) can be employed at the output of comparator 414. Although not shown, it can be appreciated that the latch 802 can be utilized in systems 400, 400$_A$ and/or 400$_B$. Moreover, the latch 802 is reset based on the output of the comparator 414, which in turn can drive the PWM controller 418.

Figure 9:
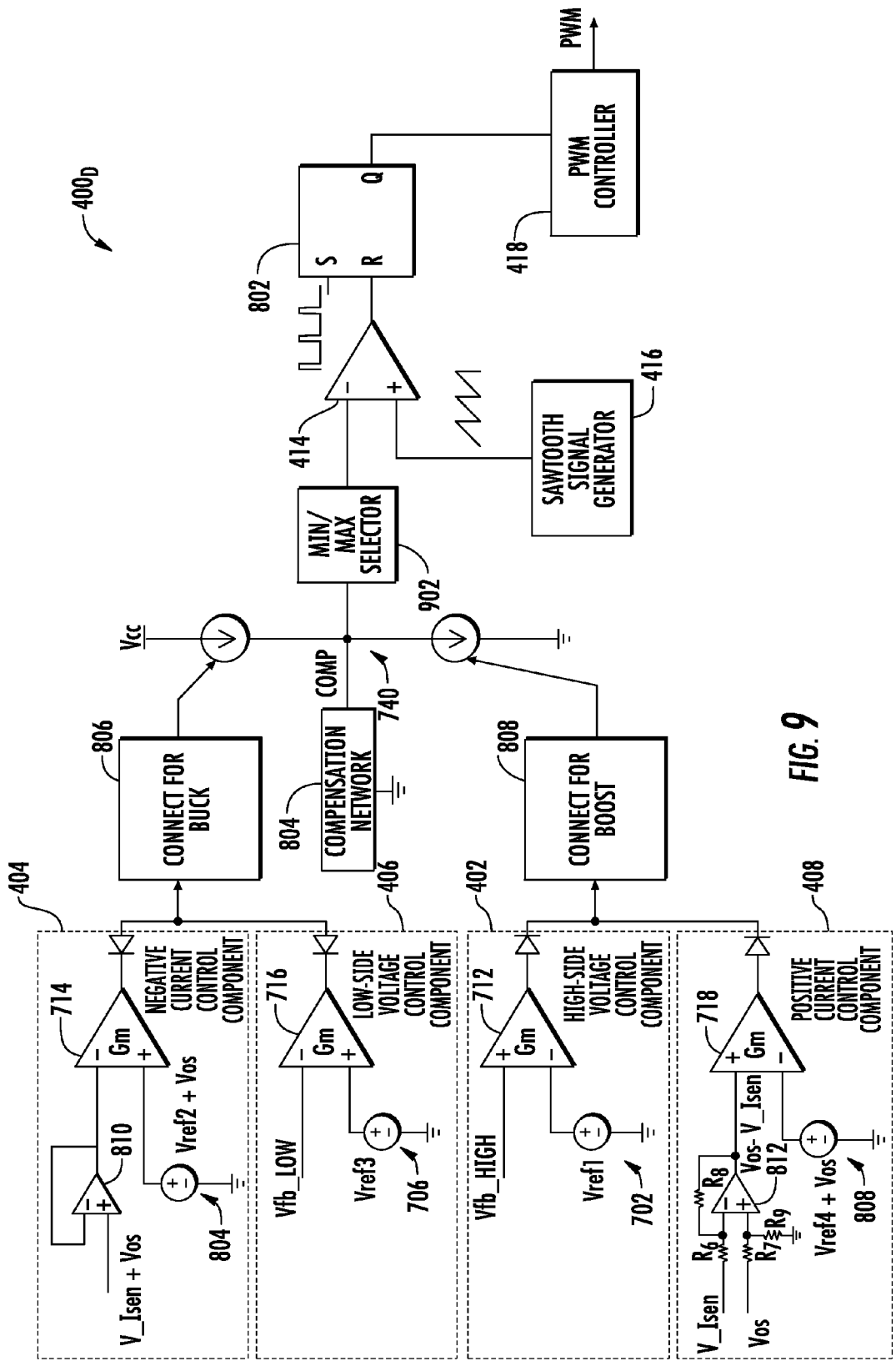
FIG. 9 illustrates an example implementation for a system that provides a priority for voltage and current regulation in bidirectional DC-DC converter.

Referring now to FIG. 9, there illustrated is an example system 400$_D$ that enables prioritizing control of a bidirectional DC-DC converter, according to an aspect of the disclosure. Specifically, a minimum or maximum selector 902 can be utilized to set the priority. For example, if a higher priority is desired for controlling the buck operation of the bidirectional DC-DC converter, a minimum selector can be utilized, and/or if a higher priority is desired for controlling the boost operation of the bidirectional DC-DC converter, a maximum selector can be utilized. Moreover, the control components 402-408 can operate and include functionality, as more fully described with respect to system 400$_C$ supra. By utilizing either a minimum or a maximum selector, higher priority can be given to either negative current and low-side voltage control or positive current and high-side voltage control. Typically, the PWM controller 418 can be controlled based on the applied priority.

Figure 10:
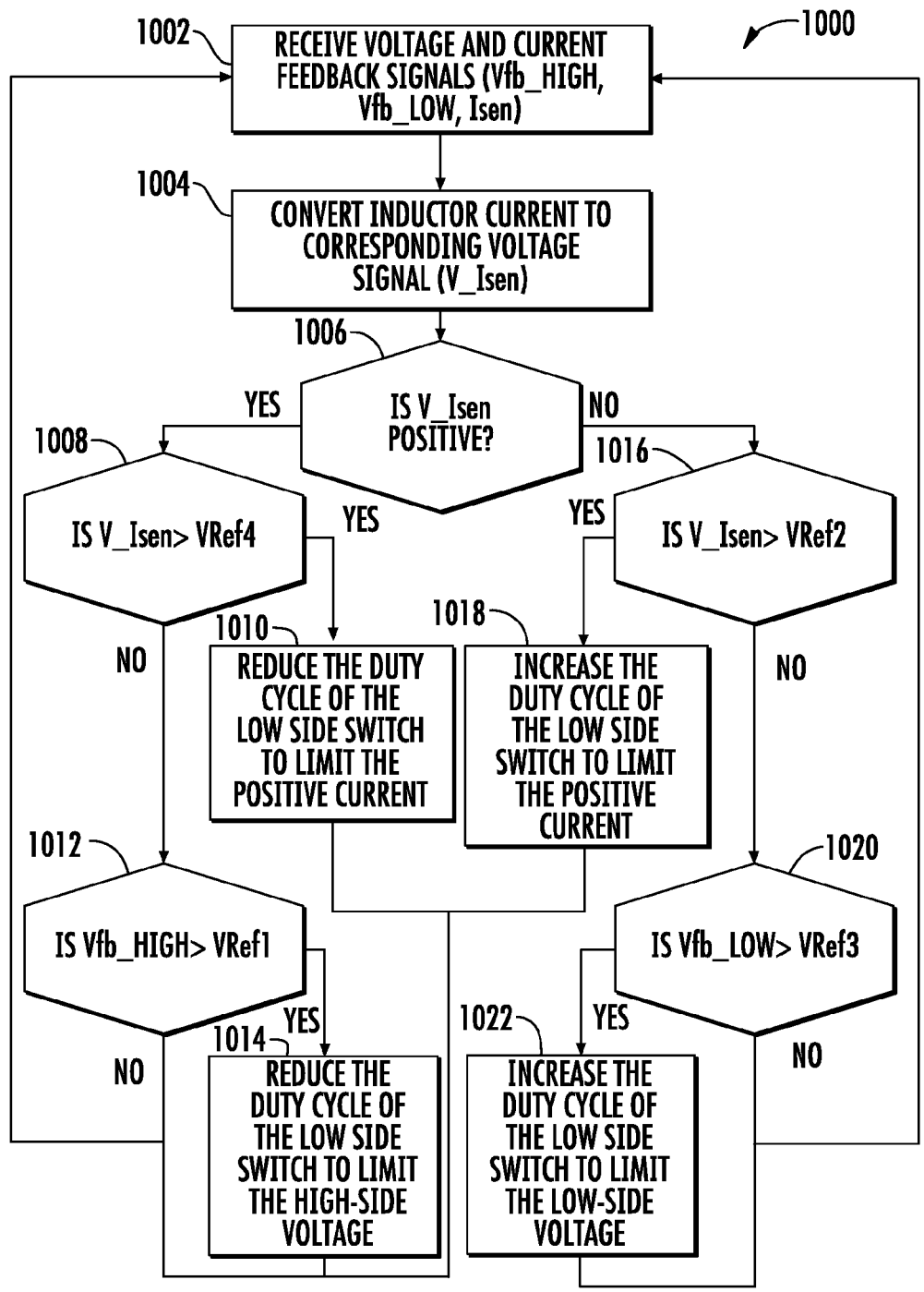
FIG. 10 illustrates an example methodology for automatically regulating power flow in a bidirectional DC-DC converter.
Figure 11:
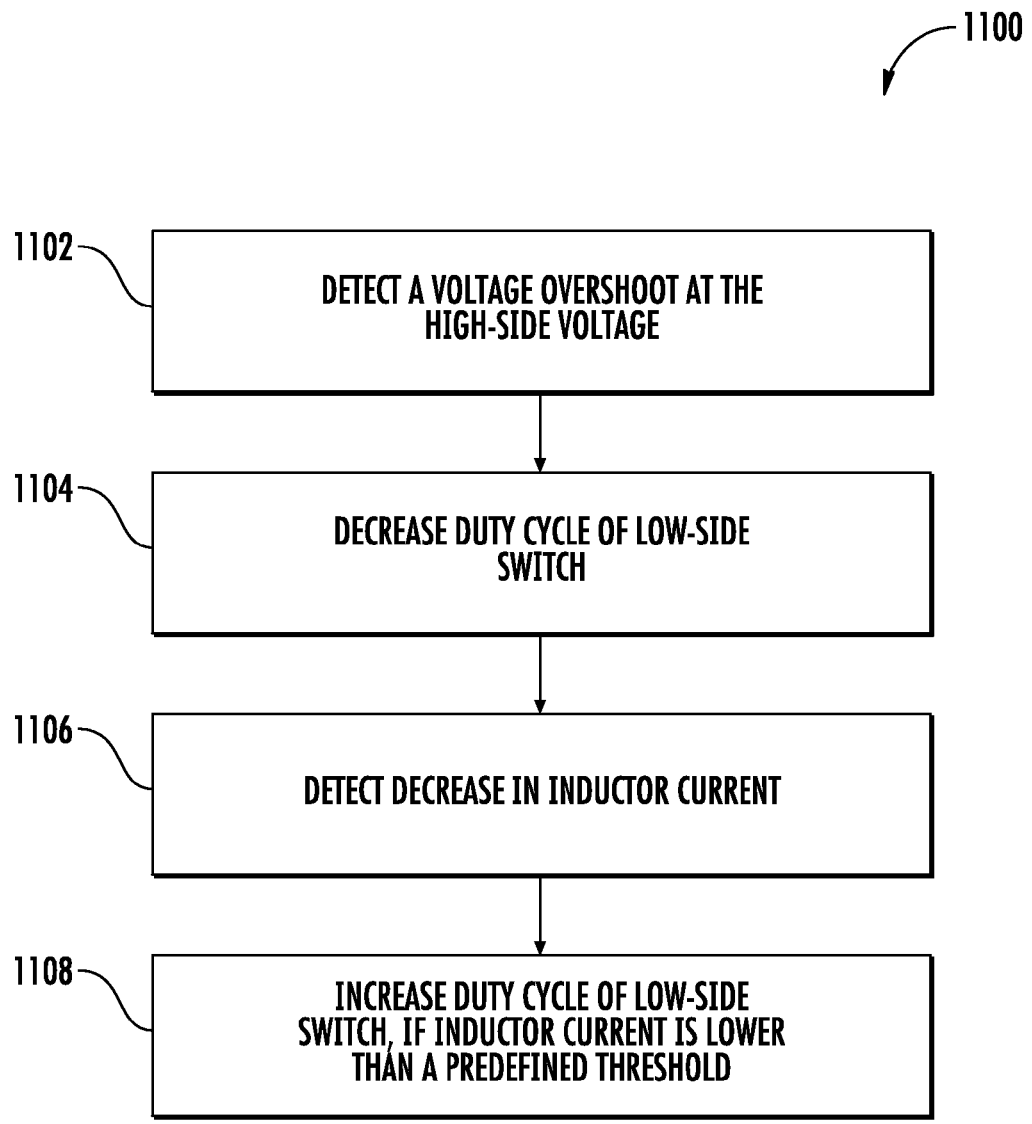
FIG. 11 illustrates an example methodology for controlling power flow in a bidirectional DC-DC converter during regenerative braking.

FIGS. 10-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, the methodologies could alternatively be represented as a series of interrelated states via a state diagram or events.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

FIG. 10 illustrates an example methodology 1000 for automatically regulating power flow in a bidirectional DC-DC converter in accordance with an aspect of the subject disclosure. Specifically, methodology 1000 controls duty cycle of a low-side switch in the bidirectional DC-DC converter based on sensed values of voltages and an inductor current, in the bidirectional DC-DC converter. Typically, the bidirectional DC-DC converter can include most any isolated or non-isolated topology, such as, but not limited to buck, boost, buck-boost, Cult, charge pump, fly-back, fly-forward, half bridge, full bridge, dual full bridge, etc. topologies, and can be utilized in various applications, such as, but not limited to, industrial automation systems, automotive systems, robotics, etc. In one aspect, the bidirectional DC-DC converter can comprise complementary switches, namely, a low-side switch and a high-side switch, for example, implemented by MOSFETs, BJTs, etc., that control the inductor current. In particular, the duty cycle of the low-side switch is an inverted version or approximately an inverted version of the duty cycle of the high-side switch (e.g., neglecting dead times). By controlling the duty cycle of one of the switches, the power flow in the bidirectional DC-DC converter can be controlled.

At 1002, voltage and current feedback signals, for example, high-side voltage (V_high), low-side voltage (V_low), and inductor current (Isen), are received from the bidirectional DC-DC converter. In one example, the feedback voltages can be scaled versions (Vfb_high, Vfb_low) of the high-side and the low-side voltages. At 1004, the inductor current (Isen) can be converted to a corresponding voltage signal (V_Isen). Typically, when the inductor current is positive, the bidirectional DC-DC converter operates as a boost converter, whereas, when the inductor current is negative, the bidirectional DC-DC converter operates as a buck converter. At 1006, it is determined whether the voltage (V_Isen) corresponding to the inductor current (Isen) is positive. If V_Isen is positive, at 1008, V_Isen is compared to a predefined threshold voltage VRef4. Typically, VRef4 can be most any value in volts representing a maximum value to limit the inductor current. If V_Isen is greater than VRef4, at 1010, the duty cycle of the low-side switch is reduced, such that the positive inductor current does not exceed the threshold value. Alternately, if V_Isen is less than VRef4, at 1012, the scaled version of the high-side voltage (Vfb_high) is compared to another predefined threshold voltage VRef1. As an example, VRef1 can be indicative of a maximum voltage value in volts, to which the high-side voltage is limited. According to an aspect, if Vfb_high is greater than VRef1, at 1014, the duty cycle of the low-side switch is reduced, such that the high-side voltage does not exceed the threshold value. In contrast, if Vfb_high is less than VRef1, the system enters a steady state, and the methodology can return to 1002.

In one embodiment, when voltage (V_Isen) corresponding to the inductor current (Isen) is negative, at 1016, the magnitude of V_Isen is compared to a threshold voltage VRef2, that represents the maximum limit for the magnitude of the negative inductor current. Moreover, if V_Isen is greater than VRef2, at 1018, the duty cycle of the low-side switch is increased, such that, the negative inductor current does not exceed the threshold value. Else, if V_Isen is less than VRef2, at 1020, a scaled version of the low-side voltage (Vfb_low) is compared to another predefined threshold voltage VRef3, which represents the maximum limit for the low-side voltage. In one aspect, if Vfb_low exceeds VRef3, the duty cycle of the low-side switch is increased, such that, the low-side voltage is reduced and does not exceed VRef3. Alternately, if Vfb_low does not exceed VRef3, the system is in a steady state, and the methodology can return to 1002.

FIG. 11 illustrates an example methodology 1100 for controlling power flow in a bidirectional DC-DC converter during regenerative braking, according to an aspect of the subject specification. At 1102, a voltage overshoot (e.g., transient voltage) is detected at the high-side of the bidirectional DC-DC converter. As an example, the voltage overshoot can occur when energy is applied to the high-side of the bidirectional DC-DC converter, for example, by an electric motor during regenerative braking. In response to the voltage overshoot at the high-side, at 1104, the duty cycle of the low-side switch in the bidirectional DC-DC converter can be decreased. In doing so, the current through the inductor decreases and at 1106, the decrease in the inductor current can be detected. Moreover, the positive inductor current decreases below zero, changes direction, and the bidirectional DC-DC converter operates as a Buck converter. In one aspect, if the inductor current becomes lower than a predefined threshold (e.g., representing a maximum negative current limit), at 1108, the duty cycle of the low-side switch is increased; such that, the negative inductor current does not exceed the predefined threshold and the system can enter a steady state. Moreover, increasing the duty cycle of the low-side switch decreases the duty cycle of a high-side switch, which in turn increases the charging time for the inductor and reduces the discharging time for the inductor. Accordingly, the negative inductor current and the low-side voltage are regulated, and the system is brought to the steady state.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, loops, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. Further, the components and circuitry elements described above can be of any suitable value in order to implement the embodiments of the present invention. For example, the resistors can be of any suitable resistance, capacitors can be of any suitable capacitance, inductors can be of any suitable inductance, amplifiers can provide any suitable gain, voltage sources can provide any suitable voltages, current sources can provide any suitable amperage, etc.

The aforementioned systems/circuits/components/loops have been described with respect to interaction between several components. It can be appreciated that such systems/circuits and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A control system, comprising:
a plurality of control components having inputs coupled to one of a voltage or a current signal received from a bidirectional direct current DC-DC converter, and having an output that provides a compensation control signal based on an analysis of the received voltage or current signal, the plurality of control components comprising:
a first boost control component enabled to receive a first voltage signal indicating a high-side voltage of the bidirectional DC-DC converter, compare the first voltage signal to a first preset voltage threshold, and output a first boost control signal to limit the high-side voltage in the bidirectional DC-DC converter if the first voltage signal is greater than the first preset voltage threshold;
a second boost control component enabled to receive a second signal related to a positive flow of inductor current in the bidirectional DC-DC converter, compare the second signal to a second non-zero preset threshold, and output a second boost control signal to limit the positive flow of inductor current in the bidirectional DC-DC converter if the second signal is greater than the second non-zero preset threshold;
a third buck control component enabled to receive a third voltage signal indicating a low-side voltage of the bidirectional DC-DC converter, compare the third voltage signal to a third preset voltage threshold, and output a third buck control signal to limit the low-side voltage in the bidirectional DC-DC converter if the third voltage signal is greater than the third preset voltage threshold;
a fourth buck control component enabled to receive a fourth signal related to a negative flow of inductor current in the bidirectional DC-DC converter, compare the fourth signal to a fourth preset threshold, and output a fourth buck control signal to limit the negative flow of inductor current in the bidirectional DC-DC converter if the fourth signal is greater than the fourth preset threshold; and
a duty cycle control circuit having an input coupled to the output of the plurality of control components, and having an output that adaptively provides a pulse width modulated (PWM) signal that controls a duty cycle of a switch within the bidirectional DC-DC converter, wherein the compensation control signal is utilized to modulate the PWM signal.

2. The control system of claim 1, wherein the first boost control component includes a first error amplifier, having a first input coupled to a scaled version of a high-side voltage of the bidirectional DC-DC converter, a second input coupled to the first preset voltage threshold, and an output coupled to a first input of a summing circuit.

3. The control system of claim 2, wherein the fourth buck control component includes a second error amplifier, having a first input coupled to a voltage corresponding to the inductor current in the bidirectional DC-DC converter, a second input coupled to fourth preset threshold, and an output coupled to a second input of the summing circuit.

4. The control system of claim 3, wherein the third buck control component includes a third error amplifier, having a first input coupled to a scaled version of a low-side voltage of the bidirectional DC-DC converter, a second input coupled to the third preset voltage threshold, and an output coupled to a third input of the summing circuit.

5. The control system of claim 4, wherein the second boost control component that includes a fourth error amplifier, having a first input coupled to the voltage corresponding to the inductor current in the bidirectional DC-DC converter, a second input coupled to the second preset threshold, and an output coupled to a first input of a minimum voltage selector circuit.

6. The control system of claim 5, wherein the output of the summing circuit is coupled to a second input of the minimum voltage selector circuit, and wherein the minimum voltage selector circuit sets a priority for controlling a buck operation of the bidirectional DC-DC converter.

7. The control system of claim 5, further comprising:
a sawtooth signal generator;
a comparator having a first input coupled to the output of the sawtooth signal generator and a second input coupled to an output of the minimum voltage selector circuit; and
a PWM controller having an input coupled to an output of the comparator;
wherein, the PWM controller generates the PWM signal.

8. The control system of claim 1, further comprising:
a voltage battery coupled to an input of the bidirectional DC-DC converter; and
a regenerative braking system coupled to an output of the bidirectional DC-DC converter.

9. A method for controlling a bidirectional direct current DC-DC converter, comprising:
receiving a first voltage signal indicating a high-side voltage of the bidirectional DC-DC converter from at least one node within the bidirectional DC-DC converter, comparing the first voltage signal to a first preset voltage threshold, and outputting a first boost control signal to limit the high-side voltage in the bidirectional DC-DC converter if the first voltage signal is greater than the first preset voltage threshold;
receiving a second signal related to a positive flow of inductor current in the bidirectional DC-DC converter from the at least one node, comparing the second signal to a second non-zero preset threshold, and outputting a second boost control signal to limit the positive flow of inductor current in the bidirectional DC-DC converter if the second signal is greater than the second non-zero preset threshold;

receiving a third voltage signal indicating a low-side voltage of the bidirectional DC-DC converter from the at least one node, comparing the third voltage signal to a third preset voltage threshold, and outputting a third buck control signal to limit the low-side voltage in the bidirectional DC-DC converter if the third voltage signal is greater than the third preset voltage threshold;

receiving a fourth signal related to a negative flow of inductor current in the bidirectional DC-DC converter from the at least one node, comparing the fourth signal to a fourth preset threshold, and outputting a fourth buck control signal to limit the negative flow of inductor current in the bidirectional DC-DC converter if the fourth signal is greater than the fourth preset threshold; and adaptively controlling a duty cycle of a switch within the bidirectional DC-DC converter in response to at least one of the first boost control signal, second boost control signal, third buck control signal, or fourth buck control signal.

10. The method of claim 9, wherein the receiving the second signal or the fourth signal includes receiving a signal indicative of a direction of current flow through an inductor in the bidirectional DC-DC converter.

11. The method of claim 10, wherein the outputting the first boost control signal, second boost control signal, third buck control signal, or fourth buck control signal further comprises coupling the first boost control signal, second boost control signal, third buck control signal, or fourth buck control signal to at least one of a pull-up current controller or a pull-down current controller.

12. The method of claim 11, further comprising: reducing the duty cycle of a low-side switch in the bidirectional DC-DC converter, in response to at least one of the high-side voltage exceeding the first preset voltage threshold or the positive inductor current exceeding the second preset threshold.

13. The method of claim 11, further comprising: increasing the duty cycle of a low-side switch in the bidirectional DC-DC converter, in response to at least one of the low-side voltage exceeding the third preset voltage threshold or the negative inductor current falling below the fourth preset threshold.

14. The method of claim 9, further comprising: generating a pulse width modulated (PWM) signal to control the duty cycle of the switch.

15. A power converter, comprising:
a first set of control components that at least one of control power flow or limit inductor current within a bidirectional direct current DC-DC converter, based on real-time measurements of at least one of a low-side voltage or negative inductor current in the bidirectional DC-DC converter, the first set of control components including:
a first buck control unit enabled to receive a first signal indicating a low-side voltage of the bidirectional DC-DC converter, compare the first signal to a first preset voltage threshold, and output a first buck control signal to limit the low-side voltage in the bidirectional DC-DC converter if the first signal is greater than the first preset voltage threshold; and
a second buck control unit enabled to receive a second signal related to a negative flow of inductor current in the bidirectional DC-DC converter, compare the second signal to a second preset threshold, and output a second buck control signal to limit the negative flow of inductor current in the bidirectional DC-DC converter if the second signal is greater than the second preset threshold; and
a second set of control components that at least one of control the power flow or limit the inductor current within the bidirectional direct current DC-DC converter, based on real-time measurements of at least one of a high-side voltage or positive inductor current in the bidirectional DC-DC converter, the second set of control components including:
a third boost control unit enabled to receive a third signal indicating a high-side voltage of the bidirectional DC-DC converter, compare the third signal to a third preset voltage threshold, and output a third boost control signal to limit the high-side voltage in the bidirectional DC-DC converter if the third signal is greater than the third preset voltage threshold; and
a fourth boost control unit enabled to receive a fourth signal related to a positive flow of inductor current in the bidirectional DC-DC converter, compare the fourth signal to a fourth non-zero preset threshold, and output a fourth boost control signal to limit the positive flow of inductor current in the bidirectional DC-DC converter if the fourth signal is greater than the fourth non-zero preset threshold.

16. The power converter of claim 15, wherein at least one of the first set of control components or the second set of control components includes an operational transconductance amplifier (OTA) that generates a current signal based on a differential input voltage.

17. The power converter of claim 15, further comprising: a comparator having a first input coupled to a sawtooth signal, and a second input coupled to a node coupled to a high voltage.

18. The power converter of claim 17, wherein the first set of buck control components pull up current at the node, in response to at least one of the low-side voltage exceeding or the negative inductor current falling below a corresponding preset threshold.

19. The power converter of claim 17, wherein the second set of boost control components pull down current at the node, in response to at least one of the high-side voltage or the positive inductor current exceeding a corresponding preset threshold.

20. The power converter of claim 17, further comprising: a PWM controller having an input coupled to an output of the comparator and an output that controls a duty cycle of a low-side switch in the bidirectional DC-DC converter.

* * * * *